United States Patent [19]

Shiraogawa

[11] 4,131,943
[45] Dec. 26, 1978

[54] MICROPROGRAMMED COMPUTER EMPLOYING A DECODE READ ONLY MEMORY (DROM) AND A MICROINSTRUCTION READ ONLY MEMORY (ROM)

[75] Inventor: Yukio Shiraogawa, Fuchu, Japan

[73] Assignee: Tokyo Shibaura Electric Co., Ltd., Tokyo, Japan

[21] Appl. No.: 807,499

[22] Filed: Jun. 17, 1977

[30] Foreign Application Priority Data

Jun. 30, 1976 [JP] Japan .................. 51-76418

[51] Int. Cl.² .................. G06F 9/16; G06F 13/00
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,631,405 | 12/1971 | Hoff | 364/200 |
| 3,646,522 | 2/1972 | Furman | 364/200 |
| 3,748,649 | 7/1973 | McEowen | 364/200 |
| 3,766,532 | 10/1973 | Liebel, Jr. | 364/200 |
| 3,839,705 | 10/1974 | Davis | 364/200 |
| 3,953,833 | 4/1976 | Shapiro | 364/200 |
| 3,983,541 | 9/1976 | Faber | 364/200 |
| 3,990,054 | 11/1976 | Perlowski | 364/200 |
| 4,001,788 | 1/1977 | Patterson | 364/200 |
| 4,038,643 | 7/1977 | Kim | 364/200 |
| 4,042,972 | 8/1977 | Gruner | 364/200 |
| 4,058,850 | 11/1977 | Sheikh | 364/900 |

Primary Examiner—James D. Thomas
Attorney, Agent, or Firm—Finnegan, Henderson, Farabow & Garrett

[57] ABSTRACT

A microprogrammed computer comprises an instruction register for registering a machine instruction word; a decode read only memory (DROM) for storing the start address data of microprogram routines which correspond to machine instruction words, respectively, and the control bit data which correspond to the machine instruction words, respectively; and a read only memory (ROM) for storing a plurality of microprograms each consisting of microinstructions. The microprogrammed computer has such a hardware structure that each control bit datum in the DROM may serve to change the function of a microinstruction and the execution sequence of the microprograms in the ROM.

10 Claims, 4 Drawing Figures

MICROPROGRAMMED COMPUTER EMPLOYING A DECODE READ ONLY MEMORY (DROM) AND A MICROINSTRUCTION READ ONLY MEMORY (ROM)

BACKGROUND OF THE INVENTION

This invention relates to a microprogrammed computer, particularly a microprogrammed computer of the vertical type which control the changes of the function of each microinstruction and the execution sequence of microprograms.

A control apparatus such as a computer has a great number of logic gates. To simplify the control logic of such a control apparatus and improve the efficiency of the same, the microprogramming method is employed. As well known, the logic gates of the apparatus are controlled according to the execution sequence of microprograms. One of the processors controlled by such microprograms is shown in U.S. Pat. No. 3,646,522.

Hitherto two microprogramming methods have been applied to microprogrammed computers. One is the horizontal microinstruction method. In this method each instruction word is made relatively long, and its bits are made to correspond to the logic gates and serve to open and close them, respectively. The other is the vertical microinstruction method, wherein each instruction word is made relatively short and many bit data, which correspond to the instruction words, are decoded so as to control the logic gates of the apparatus.

However, either microinstruction method has a drawback. If the horizontal microinstruction method is to be applied, both the microprograms and hardware structure have to be complicated because the instruction words are long. As a result, it becomes difficult to prepare microprograms. If the vertical microinstruction method is to be applied, it is easy to prepare microprograms, but a decode circuit is indispensable. Moreover, in the vertical microinstruction method, the function of each instruction word is so simple and so limited that the number of program steps (or microinstructions) should increase, inevitably lengthening the microprograms themselves.

SUMMARY OF THE INVENTION

One object of this invention is to provide a vertical type microprogrammed computer which has a simple hardware structure and which can change the function of each microprogram.

Another object of the invention is to provide a vertical type microprogrammed computer which can change the execution sequence of microprograms.

According to one aspect of this invention there is provided a microprogrammed computer which comprises an instruction register for registering a machine instruction word; a decode read only memory connected to the instruction register for storing the start address data of microprogram routines which correspond to machine instruction words, respectively, and the control bit data which correspond to the machine instruction words, respectively, said microprogram routines each consisting of a plurality of microinstructions; a control register for registering the control bit data, one at a time; a read only memory for storing the microinstructions of the microprogram routines; an address register for registering an address datum based on which a specified microinstruction is read out from the read only memory, the address register connected to the decode read only memory for receiving the start address data from the decode read only memory and also connected to the input of the read only memory; a data register for registering a microinstruction read out from the read only memory; first means for changing the function of a microinstruction stored in the data register in response to a specified control signal from the control register; and second means for feeding a specified address datum to the address register in response to a specified control signal from the control register, thereby changing the execution sequence of the microprograms in the read only memory.

The microprogrammed computer will be further understood by the following description, with reference to the accompanying drawings.

DETAILED DESCRIPTION OF THE PREFERRED EMBODIMENT

Figure 1:
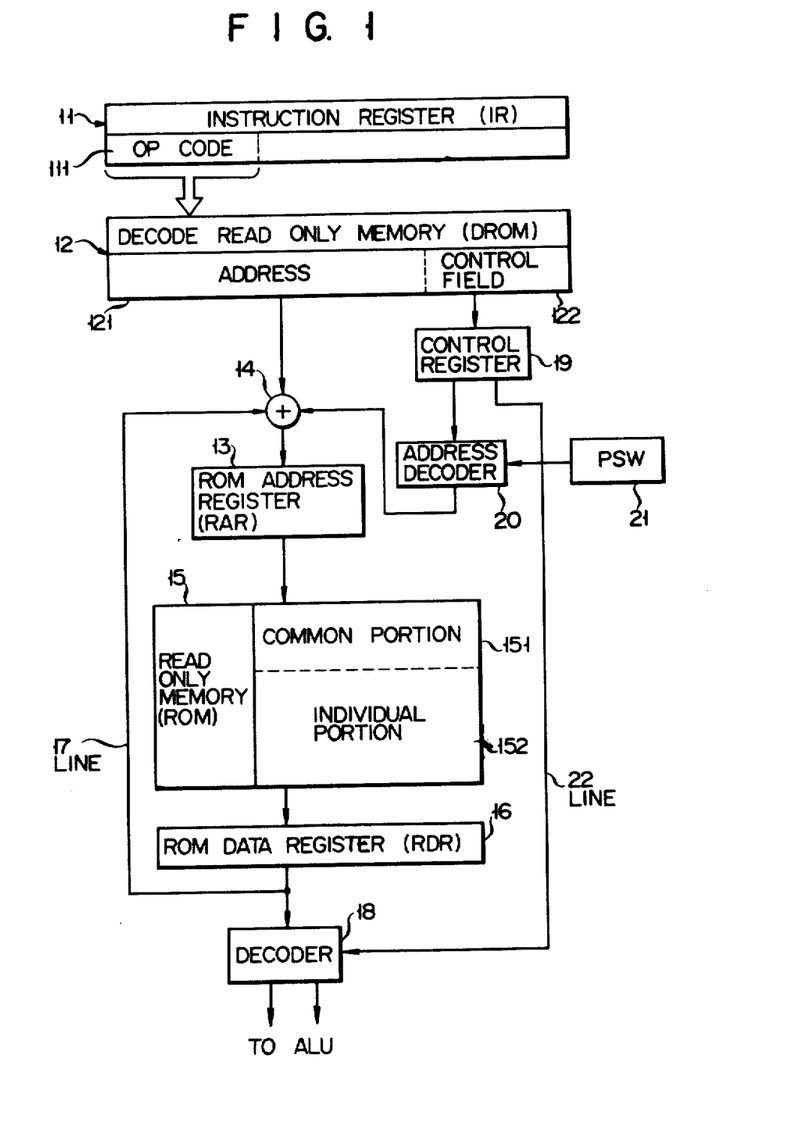
FIG. 1 is a system block diagram showing a microprogrammed computer, one embodiment of the present invention.

The microprogrammed computer shown in FIG. 1 is provided with an instruction register (IR) 11. Into the instruction register 11 a machine instruction word (or macroinstruction) is registered through a bus (not shown). The register 11 has, for example, an operation code field 111 of 8 bits and an address field of 8 bits. Further provided is a decode read only memory (DROM) 12 which has a plurality of address fields and a plurality of control fields. The DROM 12 decodes an operation code supplied from the operation code field 111 of the register 11, thereby to designate one address field 121 of, for example, 12 bits and one control field 122 of, for example, 4 bits which correspond to the operation code. In the address field 121 there is stored the start address of the machine instruction word registered in the instruction register 11. In the control field 122 there is stored control datum which serves to control the execute operation of the machine instruction word, microinstruction and microprogram.

Further provided is a ROM address register (RAR) 13. It is, for instance, a 12-bit register and stores an address datum supplied from the DROM 12 through an OR gate 14. Connected to the RAR 13 is a read only memory (ROM) 15 which stores a plurality of microprograms. The ROM 15 is divided into two portions, a common portion 151 and an individual portion 152. Some microprograms are stored in the common portion 151 and the others in the individual portion 152 in accordance with the types of the corresponding machine instruction words and the manner in which they are to be executed. Upon receipt of an address datum the RAR 13 designates the address of a microprogram in the ROM 15. The microinstructions of the designated microprogram are read out from the ROM 15 and then are latched by a ROM data register (RDR) 16, one at a time. The RDR 16 is, for example, a 16-bit register. If the microinstruction stored in the RDR 16 is a branch instruction, the start address of the branch instruction is stored into the RAR 13 through a line 17 and the OR gate 14.

A decoder 18 is connected to the RDR 16 so as to decode the microinstruction stored in the RDR 16. Upon completion of the decoding, the decoder 18 supplies a decode signal to an arithmetic logic unit (ALU) which will be described later on.

A control register 19 is connected to the DROM 12 so as to register the control datum stored in the control field 122 of the DROM 12. It is constituted by a plurality of bits which are to designate microinstructions such as short type instructions (RR instruction, SF instruction), RX/RS instruction, privilege instruction (i.e. instruction to initiate the execution of a control program, and not given by the user) and branch instruction, respectively. Connected to the control register 19 is an address decoder 20 which designates the address of a microinstruction stored in the common portion 151 of the ROM 15. Connected to the address decoder 20 is a program status word register (PSW) 21. The PSW 21 so controls the address decoder 20 that the decoder 20 designates a specified address in the common portion 151 thereby to initiate an operation according to the microinstruction which corresponds to the specified address. The PSW 21 is a conventional one which designates the execution status of each program and registers the results of an arithmetic operation, the start address of a microprogram to be executed next, and the like.

The address datum registered in the RAR 13 represents either a start address of the common portion 151 corresponding to a type of machine instruction word or the start address of a microprogram in the common portion 151 for executing an interruption process which corresponds to a machine instruction word against such a privilege instruction or the like. If the control register 19 registers a control datum for changing the function of a microinstruction, it supplies the control datum to the decoder 18 through a control line 22.

Figure 2:
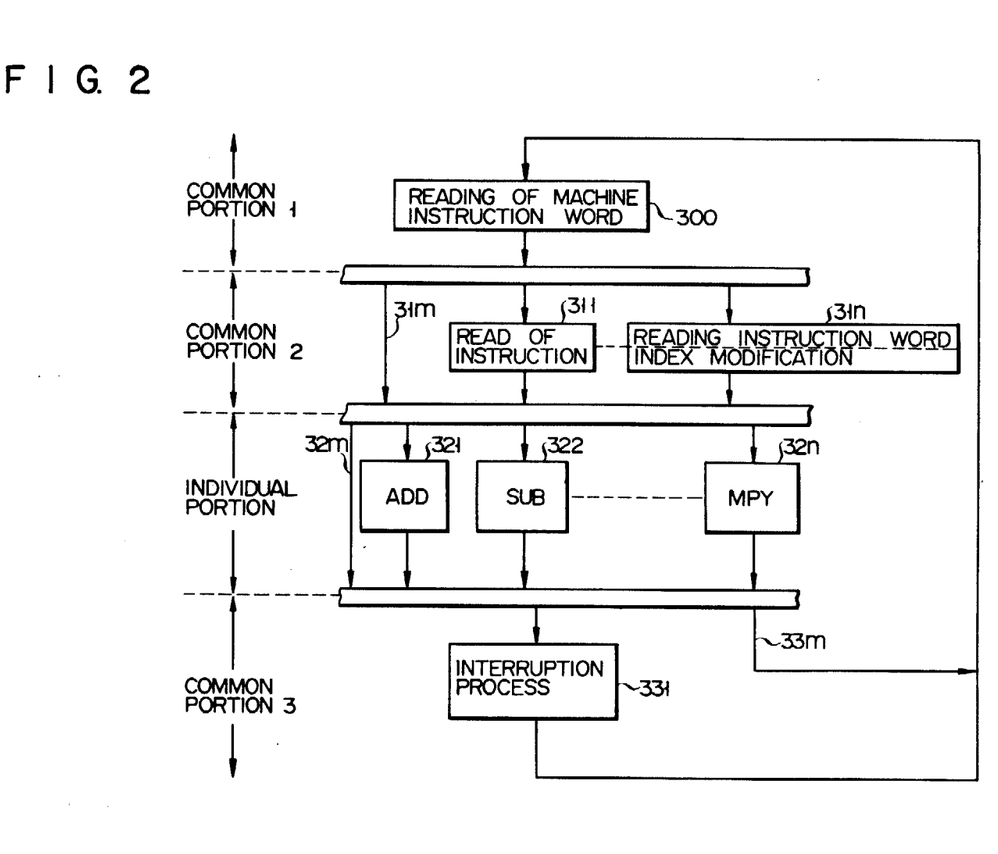
FIG. 2 is a flow chart of the microprogrames used in the microprogrammed computer of this invention.

All the machine instruction words (i.e. macroinstructions) pass through the common portion 1 of the flow chart shown in FIG. 2. In the common portion 1 of the flow chart, which corresponds to the common portion 151 of the ROM 15, operation 300 is carried out to read out a machine instruction word from the instruction register 11. Each machine instruction word is a one-word type one or a two-word type one. Further, it may be index-modified or not. Thus, there are various types of machine instruction words. According to the types of the machine instruction words, some microprograms 311, 312, ... 31n are executed and the other microprograms are not executed in the common portion 2 of the flow chart.

Upon execution of each microprogram in the common portion 2 of the flow chart, there are defined the contents of a first operand (general register number, mask value or numeral data) and the contents of a second operand (general register number, index number, address designation or numeral data designation). On the other hand, the machine instruction word 31m (only one shown in FIG. 2) which are, for example, one-word type ones (e.g. RR and SF instructions) and which need not be executed in the common portion 2 are put directly into the individual portion of the flow chart which corresponds to the individual portion 152 of the ROM 15. In the individual portion of the flow chart, microprograms (microinstructions) 321, 322, ... 32n corresponding to the machine instruction words (i.e. macroinstructions) are executed. Each microprogram is carried on to the common portion 3 of the flow chart if the central processing unit (CPU) generates an interruption signal at the time the microprogram is executed completely. If the CPU generates an interruption signal at such time, a no-operation 33m is executed in the common portion 3 and then operation is return to the common portion 1 of the flow chart, so that the microprogram is executed in the common portion 1 in response to a new machine instruction word in the same manner as described above.

A microprogram cannot be executed in the individual portion of the flow chart in a case where the machine instruction word 32m read out from the instruction register 11 is, for example, an illegal instruction or a privilege instruction and the PSW 21 prohibits the execution of the privilege instruction. In this case the operation of the program is directly shifted to the common portion 3 of the flow chart. In the common portion 3, an interruption process 331 is carried out in response to the machine instruction word 32m (e.g. privilege instruction) upon completion of all the operations in the common portions 1 and 2.

With reference to the flow chart shown in FIG. 2, it will be now described how the microprogrammed computer of FIG. 1 is operated.

In the common portion 1 of the flow chart, a machine instruction word is registered in the instruction register 11. Then, the contents of the operation code field 111 of the register 11 are supplied to the DROM 12. In the DROM 12 the address field and control field which correspond to the machine instruction word are therefore designated. The designated control field 122 of the DROM 12 supplies a control datum to the control register 19. Then the control register 19 or the PSW 21 causes the address decoder 20 to form an address datum which serves to execute an microprogram in the common portion 151 of the ROM 15. This address datum is registered in the RAR 13. The address datum represents, for example, the start address of one of the microprograms in the common portion 151 which correspond to the machine instruction words of different types. Or it represents that start address of the microprogram in the common porton 151 for executing an interruption process which corresponds to a machine instruction word against such a privilege instruction or the like. When the address is registered in the RAR 13, the corresponding microprogram is executed in the common portion 151 of the ROM 15. In similar manner the other microprograms in the common portion 151 are executed one after another.

When all the microprograms in the common portion 151 are executed, an address datum is supplied to the RAR 13 from the address field 121 of the DROM 12. The address datum is identical with the start address of one of the microprograms stored in the individual portion 152 of the ROM 15. When the address datum is registered in the RAR 13, the corresponding microprogram is executed. In this manner, the other microprograms in the individual portion 152 are executed sequentially.

Each control datum supplied to the control register 19 from the control field 122 of the DROM 12 contains a control signal which serves to change the function of each microinstruction. The control datum is supplied from the control register 19 to the decoder 18, thereby to change the function of a microinstruction.

Figure 3:
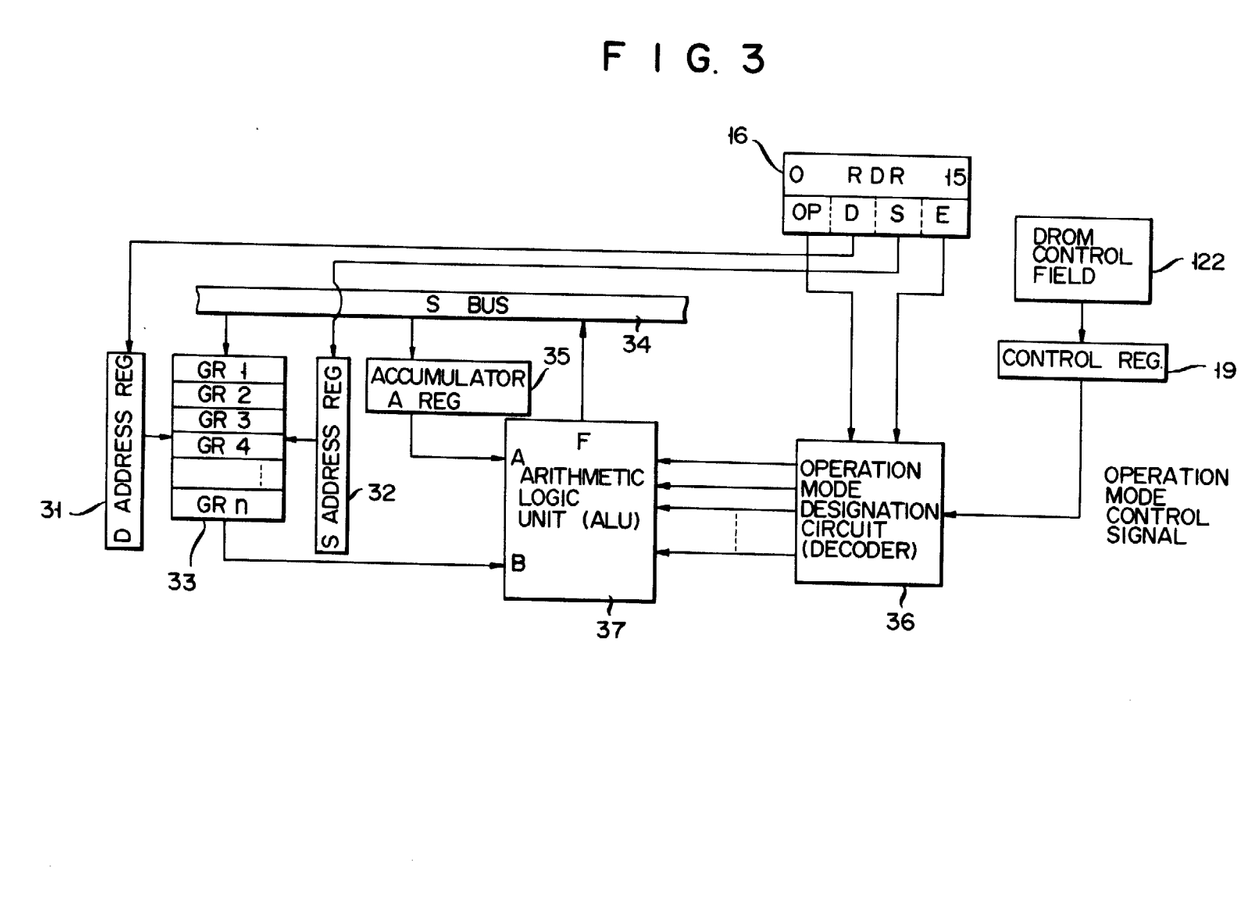
FIG. 3 is a circuit diagram explaining how the function of a microinstruction is changed in the microprogrammed computer shown in FIG. 1.

Such changes of the function of a microinstruction is effected by such a circuit as shown in FIG. 3. In this circuit the RDR 16 is constituted by an operation code field OP, a destination address field D, a source address field S and an extended control field E, each consisting of 4 bits. In the destination field D and the source address field S the general register number is stored. The extended control field E stores a control datum which designates an instruction mode other than the mode designated by an operation code when it is desired that the second-mentioned mode be extended.

The circuit is provided with a destination address register 31 and a source address register 32. The destination address register 31 stores the destination address datum from the destination address field D of the RDR register 16, and the source address register 32 stores the source address datum from the source address field S. Based on the data from the RDR register 16 these registers 31 and 32 cooperate to designate one of the general registers GR1, GR2, GR3, ... GRn which constitute a general register unit 33. Into the designated general register among the general register unit 33 there are stored a specified address, data and numeral data through a source bus 34. Also a first operand for an arithmetic logic operation is stored into an accumulator register (AREG) 35 through the source bus 34. Connected to the general register unit 33 and the AREG 35 is an arithmetic logic unit (ALU) 37, which receives the outputs of the designated general register (GR1 and GRn) and the AREG 35. Based on these outputs the ALU 37 effects an arithmetic operation or a logical operation. The results of the operation are stored into the designated general register through the source bus 34.

To the ALU 37 there is connected an operation mode designation circuit (or decoder) 36 which corresponds to the decoder 18 shown in FIG. 1. The operation mode designation circuit 36 receives the operation code datum and extended control datum from the field OP and field E of the RDR 16, respectively. Based on these data the circuit 36 designates a specified operation mode. But when a specified bit of the control register 19 has "1" level, the circuit 36 changes the designated operation mode to another. The operation mode designation circuit 36 is, for example, a 16-to-1 selection circuit and so designed as to select one of the operation modes (e.g. ADD, SUB, AND, OR, XOR, LOAD and MPY) which correspond to the input data.

Now it will be explained how the function of each microinstruction is changed in practice, with reference to FIGS. 1, 2 and 3.

Suppose the functions of such microinstructions as shown in the following table are to be changed in case such machine instruction words (i.e. macroinstructions) as shown in the same table are given.

Table 1

| | Program | Contents |
|---|---|---|
| Machine Instruction Word A: | ADD GR1, GR2 | GR1 ← GR1+GR2 |
| Microinstructions: | L AREG, GR1 | AREG ← GR1 |
| | A GR1, GR2 | GR ← AREG+GR2 |
| Machine Instruction Word B: | SUB GR1, GR2 | GR1 ← AREG+GR2 |
| Microinstructions: | L AREG, GR1 | AREG ← GR1 |
| | S GR1, GR2 | GR1 ← AREG−GR2 |

Machine instruction word A ("ADD GR1, GR2") demands that the contents of the general register GR2 be added to the contents of the general register GR1 and that the results of the addition be stored into the general register GR1. To this macroinstruction the following microinstructions correspond:

$$\left(\begin{array}{l} \text{L AREG, GR1} \\ \text{A GR1, GR2} \end{array}\right.$$

On the other hand, machine instruction word B ("SUB GR1, GR2") demands that the contents of the general register GR2 be subtracted from the contents of the general register GR1 and that the results of the subtraction be stored into the general register GR1. To this macroinstruction the following microinstructions correspond:

$$\left(\begin{array}{l} \text{L AREG, GR1} \\ \text{S GR1, GR2} \end{array}\right.$$

If the machine instruction word A is fed into the instruction register 11, the operation code "ADD" designates the corresponding address field and control field of the DROM 12. Then, the corresponding address datum and control datum are registered in the RAR 13 and the control register 19, respectively. If all the bits of the control datum registered in the control register 19 have "0" level, the microinstruction "L AREG, GR1" is stored into the RDR 16 from the individual portion 15₂ of the ROM 15, which the RAR 13 has designated based on the address datum. As a result, the load microinstruction code "L" is stored into the field OP of the RDR 16, the number of the general register storing the address of the AREG 35 is stored into the field D, and the number of the general register GR1 is stored into the field S.

When the execution of the microinstruction "L AREG, GR1" is completed, the number of the register GR1 is registered in the source address register 32. Thus the register GR1 of the general register unit 33 is designated. Then, the contents of the general register GR1 are supplied to the terminal B of the ALU 37, and finally stored into the AREG 35 through the terminal F of the ALU 37 and the source bus 43.

The second microinstruction "A GR1, GR2" is then stored into the RDR 16. When the execution of this microinstruction is finished, the operation code "A" is supplied to the addition mode designation circuit 36. Upon receipt of the operation code "A" the circuit 36 designates an addition mode to the ALU 37. Thus, in the ALU 37 the contents of the general register GR2 are added to the contents of the AREG 35. The results of the addition are stored into the general register GR1 via the source bus 34.

If the machine instruction word B "SUB GR1, GR2" is fed into the instruction register 11, a subtraction is performed. Unlike the machine instruction word A, the word B serves to change the function of a microinstruction in the following manner.

First, the operation code "SUB" designates the corresponding address field and control field of the DROM 12. Then the control datum in the designated control field 122 is registered in the control register 19. This control datum contains an operation mode control bit of "1" level. The control datum is supplied to the operation mode designation circuit 36. At this time the RDR 16 is storing the second microinstruction "A GR1, GR2" which corresponds to the machine instruction word A "ADD GR1, GR2". For this reason, the output of the AREG 35 is supplied to the terminal A of the ALU 37, and the output of the general register GR2 to the terminal B of the ALU 37. In response to the operation mode control bit, the operation mode designation circuit 36 changes the addition mode of the ALU 37 to a subtraction mode. As a result, the contents of the general register GR2 are taken from the contents of the general register GR1. The results of the substraction are stored into the general register GR1 through the source bus 34. This change of the function of microinstruction corresponds to the change of operation in the individual portion of the flow chart shown in FIG. 2. The operations in the common portions 1, 2 and 3 of the flow chart are not changed as in the execution of the microprogram which corresponds to the machine instruction word A.

The above-mentioned change of the function of microinstruction will be more understood if comparison is made between the two microprograms shown in Table 1 which correspond to the machine instruction words A and B. The microprograms differ only in that the former has an addition code "A" while the latter has a subtraction code "S". All the other parts either microprogram are the same. Thus, the microinstruction "A GR1, GR2" can be changed to the microinstruction "S GR1, GR2" only if a control bit of "1" level is contained in the control datum in the control field of the DROM 12 which is designated by the operation code "SUB" from the instruction register 11. Such changes of the function of the microinstruction are not limited to machine instruction words "ADD" and "SUB". The changes of the function of the microinstruction can be applied to other machine instruction words, provided that some additional control bits of "1" level are contained in the control datum in the designated control field of the DROM 12.

Figure 4:
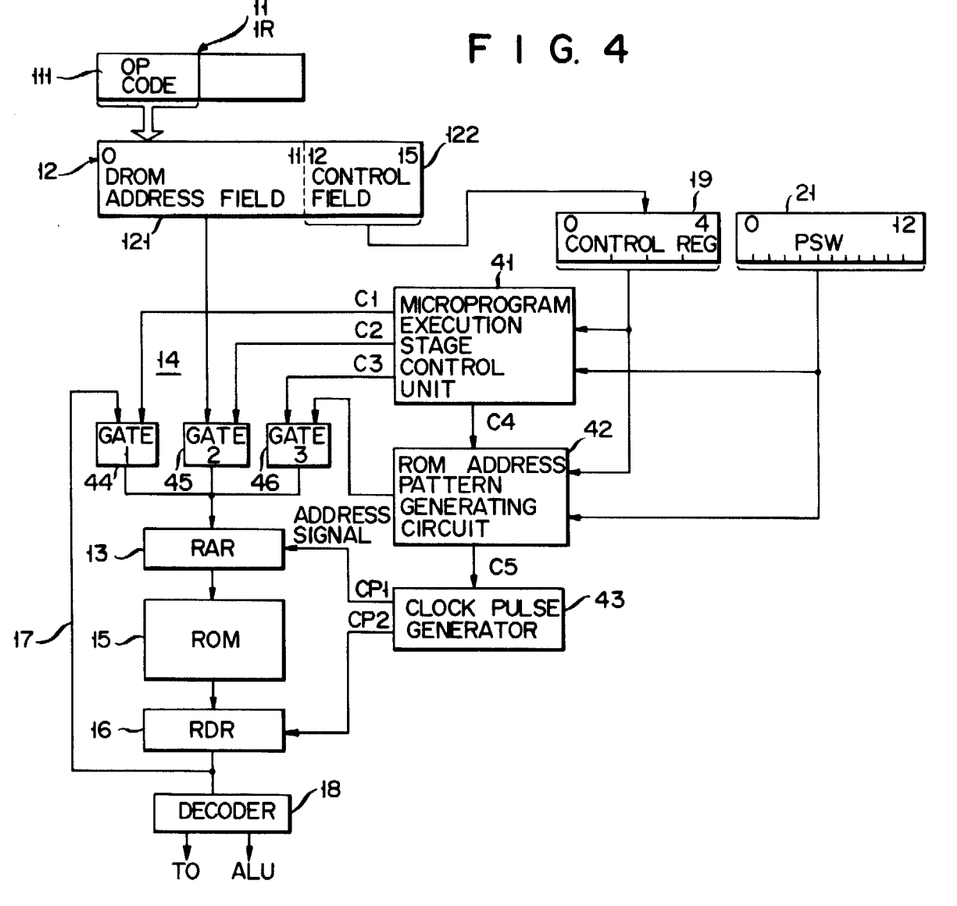
FIG. 4 is a circuit diagram explaining how the execution sequence of microprograms is changed in the microprogrammed computer shown in FIG. 1.

Not only such changes of the function of microinstructions, but also the changes of the execution sequence of microprograms can be achieved by such a circuit as shown in FIG. 4.

The circuit of FIG. 4 has a microprogram execution stage control unit 41 designed to change the order (effective address) in which the microprograms stored in the ROM 15 are to be executed. The control unit 41 is connected to the control register 19 and the PSW 21. Upon receipt of control data from the control register 19 and the PSW 21, the control unit 41 generates gate control signals C1, C2 or C3 and/or a control signal C4. It depends on the contents of the control data which of gate control signals C1, C2 or C3 will be produced. Further the control unit 41 monitors which stage of the microprograms is being executed. It may be constituted by a monitor circuit usually employed in the computers.

The control unit 41 generates the gate control signal C1 when the sequence control bit in the control data from the control register 19 and the PSW 21 has "0" level and the microinstruction registered in the RDR 16 is a branch instruction. The gate control signal C2 is generated when the sequence control bit has "0" level and designates the start address of the microprogram corresponding to the machine instruction word. Both gate control signal C1 and control signal C4 are produced when the sequence control bit has "1" level.

Though not shown in FIG. 4, the microprogram execution stage control unit 41 receives a control signal from another circuit.

Connected to the control unit 41 is a ROM address pattern generating circuit 42. In response to a control signal C4 from the control unit 41 the circuit 42 is driven to generate a control signal C5 and an address pattern. The address pattern thus produced consists of, for example, 12 bits and represents the address of the microprogram whose execution stage is to be changed. The control signal C5 is supplied to a clock pulse generator 43. Driven by the control signal C5, the clock pulse generator 43 generates two timing clock pulses CP1 and CP2 which serve to determine when the execution sequence of microprograms should be changed. The clock pulse CP1 is supplied to the RAR 13, and the clock pulse CP2 to the RDR 16.

Three gates 44, 45 and 46 are connected to the microprogram execution stage control unit 41. They correspond to the OR gate 14 shown in FIG. 1. The gate 44 opens in response to the gate control signal C1 from the control unit 41. That is, it opens when a branch microinstruction is registered in the RDR 16, thereby to let a branch address pass through it. The gate 45 opens in response to the gate control signal C2. Namely, it opens thereby to let pass through it the start address of the microprogram corresponding to the machine instruction word. The gate 46 opens in response to the gate control signal C3, thereby to let pass through it an address signal from the ROM address pattern generating circuit 42.

(a) Suppose such an operation as shown in the common portion 1 of the flow chart of FIG. 2 is performed to register in the instruction register 11 an ordinary machine instruction word, for example, the word A "ADD GR1, GR2" shown in Table 1. Then the machine instruction word A designates the corresponding address and control fields of the DROM 12. Thus, from the designated address field 121 there is read out the address datum which represents the start address of the microprogram corresponding to the machine instruction word A. Simultaneously, the control datum is read out from the designated control field 122 of the DROM 12. At first, the control datum is stored into the control register 19. In this case the execution stage of the microprogram is understood not to be changed. Thus, the control datum registered in the control register 19 and the control datum registered in the PSW 21 at this time have all of their bits at "0" level. As a result, the microprogram execution stage control unit 41 produces a gate control signal C2. The gate control signal C2 is then supplied to the gate 45. The start address of the microprogram is therefore permitted to enter the RAR 13 from the address field 121 of the DROM 12 through the gate 45. Upon receipt of the start address, the RAR 13 designates the corresponding address in the ROM 15. Consequently, the microinstruction which is read out from the ROM 15 is set into the RDR 16, and then the microinstruction stored in the RAR 16 is supplied to the decoder 18. Thereafter the microprogram routine which corresponds to the machine instruction word A is carried out.

(b) Suppose the machine instruction word registered in the instruction register 11 is a branch instruction word. In a similar manner as item (a), the corresponding branch microinstruction is read out from the ROM 15 into the RDR 16. Since the RDR 16 now registers the branch microinstruction, a branch address is supplied to the gate 44 through the line 17. Then, a control signal (not shown) is supplied to the microprogram execution stage control unit 41. Driven by this control signal, the control unit 41 generates a gate control signal C1. Upon receipt of the gate control signal C1 the gate 44 opens thereby to feed the branch address to the RAR 13. Thereafter such operations as mentioned in the preceding paragraph are carried out.

(c) Suppose the machine instruction word registered in the instruction register 11 is a privilege instruction word. In this case, the control field 122 of the DROM 12 designated by the instruction word stores a control datum whose sequence control bits has "1" level. Accordingly, the control bit datum is set into the control register 19. If the program status word registered in the PSW 21 at this time indicates that the privilege instruction is impossible, the privilege instruction should not be executed and an interruption process should therefore be carried out. To effect an interruption process 331 the microprogram execution stage should be shifted to the common portion 3 of the flow chart shown in FIG. 2. In order to achieve such shifting of the microprogram execution stage, the microprogram execution stage control unit 41 generates a gate control signal C3 and a control signal C4. In response to the control signal C3 the ROM address pattern generating circuit 42 generates a control signal C5 and an address signal which represents the address of the microprogram whose execution stage is to be changed. The address signal is supplied to the gate 46. Then, already supplied with the gate control signal C3, the gate 46 opens to feed the address signal to the RAR 13. In the meantime, the control signal C5 is supplied to the clock pulse generator 43. Upon receipt of the control signal C5 the clock pulse generator 43 generates clock pulses CP1 and CP2, which are supplied to the RAR 13 and the RDR 16, respectively. Then, the address signal registered in the RAR 13 designates the corresponding microprogram in the ROM 15. Consequently, the designated microprogram is read out into the RDR 16, whereby the routine of the microprogram is also carried out in the same manner as mentioned above. In this manner the execution sequence of microprograms is changed.

What is claimed is:

1. A microprogrammed computer comprising an instruction register for registering a machine instruction word; a decode read only memory connected to said instruction register for storing the start address data of microprogram routines which correspond to machine instruction words, respectively and the control bit data which correspond to the machine instruction words, respectively, said microprogram routines each consisting of a plurality of microinstructions; a control register for registering the control bit data, one at a time; a read only memory for storing the microinstructions of the microprogram routines; an address register for registering an address datum based on which a specified microinstruction is read out from the read only memory, said address register connected to the decode read only memory for receiving the start address data from said decode read only memory and also connected to the input of said read only memory; a data register for storing the microinstruction read out from the read only memory; first means for changing the function of the microinstruction stored in the data register in response to a specified control signal from the control register; and second means for feeding a specified address datum to the address register in preference to the start address data sent to the address register from the decode read only memory in response to a specified control signal from the control register, thereby changing the execution sequence to the microprograms in the read only memory.

2. A microprogrammed computer according to claim 1, wherein said first means comprises a plurality of general registers; an accumulator register for registering a first operand datum of an arithmetic/logic operation; an arithmetic logic unit for executing arithmetic and logical operations based on the outputs of the general registers and the accumulator register; bus means for supplying the output of the arithmetic logic unit; and an operation mode designation means for designating normally the mode of the operation to be executed in the arithmetic logic unit in accordance with the microinstruction stored in said data register and for designating, when said control register stores a control bit datum which instructs a change of function of microinstruction, a mode of operation different from the mode of operation designated according to the microinstruction stored in said data register.

3. A microprogrammed computer according to claim 2, wherein said operation mode designation means is constituted by a decoder circuit which designates one of operation modes in accordance with the output of said data register and the control signal from said control register.

4. A microprogrammed computer according to claim 2, further comprising an address register for storing a specified register datum from said data register and selecting, based on the register datum, one of said general registers.

5. A microprogrammed computer according to claim 1, wherein said second means comprises execution stage control means for controlling the execution stage of a microprogram in accordance with a specified control bit datum stored in said control register; address pattern generating means for generating in response to the specified control bit datum an address pattern representing the microprogram whose execution stage is to be changed; a clock pulse generator for generating timing signals to drive said address register and said data register, thereby to change the execution stage of a microprogram; and gate means for supplying a specified address datum to said address register under control of the control signals from said execution stage control means.

6. A microprogrammed computer according to claim 5, wherein said execution stage control means generates a first control signal to control the branch address of a branching instruction, a second control signal to control the start address of a microprogram routine from said decode read only memory, and a third control signal to control an address generated by said address pattern means, thereby to change the execution stage of the microprogram represented by the address pattern.

7. A microprogrammed computer according to claim 5, wherein said gate means is constituted by a plurality of gates corresponding to the control signals derived from the execution stage control means, and said gates includes at least three gates, a first gate to pass the branch address of a branch instruction, a second gate to pass the start address of a microprogram routine from said decode read only memory, and a third gate to pass an address generated by said address pattern generating means.

8. A microprogrammed computer according to claim 5, further comprising a program status word register which supplies a program status word to said execution stage control means and said address pattern generating means, thereby to change the execution stage of a microprogram.

9. A microprogrammed computer comprising an instruction register for registering a machine instruction word; a decode read only memory connected to said instruction register for storing the start address data of microprogram routines which correspond to machine instruction words, respectively and the control bit data which corresponds to the machine instruction words, respectively, said microprogram routines each consisting of a plurality of microinstructions; a control register for registering the control bit data, one at a time; a read only memory for storing the microinstructions of the microprogram routines; an address register for registering an address datum based on which a specified microinstruction is read out from the read only memory said address register connected to the input of said read only memory; a data register for registering the microinstruction read out from the read only memory; a plurality of general registers; an accumulator register for registering a first operand datum of an arithmetic/logic operation; an arithmetic logic unit for executing arithmetic and logical operations based on the outputs of the general registers and the accumulator register; a bus for supplying the output of the arithmetic logic unit; and an operation mode designation circuit for designating normally the mode of the operation to be executed in the arithmetic logic unit in accordance with the microinstruction stored in said data register and for designating, when said control register stores a control bit datum which instructs a change of function of microinstruction, a mode of operation different from the mode of operation designated according to the microinstruction stored in said data register.

10. A microprogrammed computer comprising an instruction register for registering a machine instruction word; a decode read only memory connected to said instruction register for storing the start address data of microprogram routines which correspond to machine instruction words, respectively and the control bit data which correspond to the machine instruction words, respectively, said microprogram routines each consisting of a plurality of microinstructions; a control register for storing the control bit data, one at a time; a read only memory for storing the microinstructions of the microprogram routines; an address register for registering an address datum based on which a specified microinstruction is read out from the read only memory, said address register connected to the input of said read only memory; a data register for registering the microinstruction read out from the read only memory; execution stage control means for controlling the execution stage of a microprogram in accordance with a specified control bit datum stored in said control register; an address pattern generating circuit for generating in response to the specified control bit datum an address pattern representing the microprogram whose execution stage is to be changed; a clock pulse generator controlled by the address pattern generating circuit for generating timing signals to drive said address register and said data register, thereby to change the execution stage of a microprogram; and a gate circuit for supplying a specified address datum to said address register under control of the control signals from said execution stage control means.

* * * * *